United States Patent [19]

Barabash

[11] Patent Number: 5,913,176
[45] Date of Patent: Jun. 15, 1999

[54] SYSTEM FOR VIRTUAL CONNECTION TO DEDICATED PSTN LINES

[75] Inventor: Darrell W. Barabash, Grapevine, Tex.

[73] Assignee: JRC Canada Inc., Lethbridge, Canada

[21] Appl. No.: 08/839,508

[22] Filed: Apr. 14, 1997

[51] Int. Cl.[6] .............................. H04Q 7/38; H04Q 7/22; H01Q 7/04
[52] U.S. Cl. .......................... 455/560; 455/74.1; 455/433
[58] Field of Search .................................. 455/433, 74.1, 455/445, 435, 560, 422, 554, 555, 550, 575, 90

[56] References Cited

U.S. PATENT DOCUMENTS

| | | | |
|---|---|---|---|
| 3,711,647 | 1/1973 | Boyer ...................................... | 455/74.1 |
| 3,856,982 | 12/1974 | Lawson et al. ......................... | 379/359 |
| 3,912,875 | 10/1975 | Katz ........................................ | 455/561 |
| 4,071,711 | 1/1978 | Beaupre et al. ........................ | 455/450 |
| 4,122,304 | 10/1978 | Mallien, II ............................. | 455/564 |
| 4,203,070 | 5/1980 | Bowles et al. .......................... | 375/317 |
| 4,234,764 | 11/1980 | Beebe ..................................... | 379/200 |
| 4,291,197 | 9/1981 | Yonaga .................................... | 455/411 |
| 4,369,516 | 1/1983 | Byrns ........................................ | 375/38 |
| 4,425,480 | 1/1984 | Lischin ................................... | 379/200 |
| 4,555,592 | 11/1985 | Deinzer ................................... | 455/416 |
| 4,562,307 | 12/1985 | Bursztejn et al. ...................... | 455/343 |
| 4,568,800 | 2/1986 | Orikasa .................................. | 455/463 |
| 4,574,164 | 3/1986 | Orikasa .................................. | 455/458 |
| 4,658,096 | 4/1987 | West, Jr. et al. ........................ | 455/422 |
| 4,737,975 | 4/1988 | Shafer .................................... | 379/58 |
| 4,775,997 | 10/1988 | West, Jr. et al. ........................ | 379/58 |
| 4,922,517 | 5/1990 | West, Jr. et al. ........................ | 379/58 |
| 4,972,457 | 11/1990 | O'Sullivan ............................. | 379/59 |
| 5,561,840 | 10/1996 | Alvsalo et al. ........................ | 455/433 |
| 5,594,777 | 1/1997 | Makkonen et al. .................... | 455/435 |
| 5,610,974 | 3/1997 | Lantto .................................... | 455/433 |
| 5,673,308 | 9/1997 | Akhavan ................................. | 455/445 |

*Primary Examiner*—Nguyen Vo
*Assistant Examiner*—Edan Orgad

[57] ABSTRACT

A method and apparatus are provided for connecting a telephone subscriber to the public switched telephone network ("PSTN"), where a physical connection is not available while utilizing conventional telephony subscriber terminals. The connection is provided using a wireless telecommunications system adapted with a gateway collection of lines and a switch between the wireless system and the PSTN. When a call is to be made, the wireless system sends a predetermined access number to identify the caller as a gateway caller. Thereafter, a connection is made between the wireless subscriber and a dedicated PSTN line. The method includes providing a gateway access code to the public switch to obtain a trunk line and thereafter, utilizing the normal call progression cues provided by the PSTN, such as a busy signal and dial tone. The destination telephone number dialed as DTMF is then sent over a designated voice channel by the transceiver, and the connection is made by the PSTN. An interface is provided which includes a microprocessor programmed to follow a call origination and a call reception sequence as well as circuitry providing for communication between the mobile station transceiver and the conventional telephone set.

10 Claims, 4 Drawing Sheets

SYSTEM FOR VIRTUAL CONNECTION TO DEDICATED PSTN LINES

BACKGROUND OF THE INVENTION

A. Field of the Invention

This invention relates to remote access to the public switched telephone network ("PSTN") by way of a wireless cellular telephone radio link. More specifically, the invention uses a cellular system to make a virtual connection between the dedicated lines of multiple subscribers of the PSTN and each subscriber's telephone instrument at the subscriber's home or office. The system provides each subscriber with direct access to the public switch, including all call progression cues, such as a dial tone, provided by the PSTN. Conversely, the system allows the DTMF digits entered by the user to be transmitted directly back to the PSTN. The invention thus operates with a conventional telephone in a manner consistent with normal telephone service, with the wireless portion of the transmission being transparent to the subscriber.

B. Description of the Prior Art

There are many instances in which the provision of an ordinary connection between a subscriber's home or office telephone and the PSTN, based upon a physical connection such as traditional copper wire or optical fiber, is hampered by the cost of installing the physical connection. This occurs in developing countries in which the cost of installing the whole infrastructure is prohibitive or in rural areas where it is not cost effective to make the investment in physical connections in an area of low population. In some instances, the terrain provides obstacles or hindrances to effective installation.

It may be, however, that implementation of a wireless cellular system is cost effective in such circumstances. However, it is often undesirable from a subscriber's viewpoint to go through the additional procedures required when placing a cellular call, such as initiating a send signal after dialing the destination number and experiencing some delays in signal processing which are not encountered in typical PSTN call procedures.

It has been suggested to provide a radio link between a telephone user and the public switch using a remote station transceiver controlled by a push-to-talk key actuated by the user. U.S. Pat. No. 3,912,875 (Katz) describes a system in which a wireless base station is physically connected to the public switching system. The base station provides a radio communication link with a remote station. When originating a call from the remote station, the user lifts the telephone hand set off the cradle. Associated circuitry automatically places the remote station transceiver in a transmit mode. An initiate signal is transmitted to the base station. A base station control circuit, upon reception of a pre-selected number of initiate signal pulses, connects the base station with the telephone switching system. The remote operator then dials the telephone number and the base station generates a dial pulse train and transmits it to the telephone switching system. The PSTN then makes the appropriate connections to the destination telephone number.

The Katz system, which predated the development of reliable cellular telephone systems, provides a radio link between the public switch and a remote station, however, the Katz base station and the remote station must be specially designed for this purpose. More specifically, the Katz stations, for example, communicate in only one direction at a given time. Each station must switch between the transmit and receive mode. The switching is controlled by "push-to-talk" circuits in the stations. Further, the Katz remote station uses a dial signal generator for transmitting dial signal pulses corresponding to the telephone number dialed by the user. Thus, a specially designed base station is required to convert these pulses to dial signals to which the PSTN will respond. The system allows a single user at a time to access a telephone line which is shared by remote stations.

Subsequently, when cellular telephone systems were developed, it was suggested to use a cellular telephone transceiver to place a call which appears to the user to be a PSTN call, but in which the cellular system simulates the PSTN signals and makes the physical connection to the PSTN. U.S. Pat. No. 4,658,096 (West, Jr. et al.) describes a device which simulates the PSTN such that the subscriber can use the telephone in a conventional manner, although a cellular call is being placed.

More specifically, as described in that patent, the subscriber's conventional telephone set is connected to a unit which responds to an off-hook condition by separately generating its own dial tone for the user. The user responds by dialing a telephone number in the conventional fashion. The West, Jr. et al. device then converts these tone-dial or pulse-dial numbers into a digital data bit stream and passes this data on to a cellular transceiver. The system also counts the digits entered to determine when the last digit has been entered depending, for example, upon whether a local or long distance call is being placed. The unit then provides a "SEND" signal to the transceiver. In this way, the user is not required to press a SEND button.

The call proceeds essentially as a normal cellular call between a subscriber and the dialed line. The cellular system thus completes the connection in accordance with conventional cellular technology by assigning voice channels for the communication. The West, Jr. et al. unit also responds to incoming calls received at the transceiver and rings the subscriber's telephone.

The West, Jr. et al. patent involves a complex circuit which duplicates and simulates PSTN signals. There remains a need, therefore, for a relatively simple, low cost local implementation circuit of reduced complexity.

There remains a further need for a system which can provide a radio link using conventional wireless technology including transceivers capable of full duplex operation, and a base station which does not require special circuitry for transmitting the dialed telephone number to the PSTN. Accordingly, it is an object of the present invention to provide such an improved arrangement which is of lower cost and reduced complexity.

SUMMARY OF THE INVENTION

The present invention provides each subscriber with direct access to the PSTN through a wireless "virtual" connection to a telephone line dedicated to that subscriber. More specifically, a conventional remote cellular transceiver, which is part of a wireless cellular telephone system, is coupled through an interface unit to a subscriber's telephone instrument. When the subscriber takes the telephone instrument off hook to place a call, a microprocessor in the unit signals the transceiver to immediately transmit to a cellular base station a special gateway access code as if it were placing a call to that number.

Communication is established between the transceiver and the base station in accordance with the cellular telephone protocol. Thus, calls are set up over forward and reverse control channels, with the base station then assigning forward and reverse voice channels for the subscriber's communication. Each base station communicates with an associated mobile system controller ("MSC"). The MSC includes a switch which makes connections with the PSTN. The MSC switch normally makes connections with the PSTN and then dials the telephone number which the subscriber has entered. The PSTN then makes the connection with the destination telephone number.

The system embodying the present invention instead uses a gateway connection between the MSC and the PSTN. The gateway is an access point to the PSTN and ultimately provides a dedicated path to the PSTN central office for each individual subscriber. More specifically, the gateway is a collection of dedicated access lines and associated PSTN telephone numbers. When a gateway access code is identified as such by the MSC, the MSC switch connects to the gateway. The remaining dialed digits are then processed at the gateway as DTMF and the connection for the subscriber is then completed. The result is that the base station couples the telephone line to forward and reverse voice channels assigned to the call. This provides a connection through the base station to the PSTN by way of the dedicated gateway circuit. Two-way communication is thus established between the subscriber and the PSTN switching and call routing facilities. Further, the gateway allows pass-through of call progression tones, such as dial tone, busy signal and ring back to the subscriber.

Specifically, the subscriber's dedicated PSTN line is placed in an off-hook state by the MSC's gateway. The dedicated line at the PSTN thus mirrors the on/off-hook state of the subscriber's conventional telephone. It transmits a dial tone that is coupled through to the subscriber's telephone instrument.

The subscriber can then simply dial the desired destination telephone number. The dual tone, multi-frequency ("DTMF") signals generated by the subscriber's key actuation are sent over the voice channel to the PSTN equipment by way of the gateway. The PSTN then processes the DTMF signal information in the usual manner to make the connection to the destination telephone number and the call then proceeds through the public switch as normal. The ring back and busy signals that are generated by the PSTN are conveyed back to the subscriber. Upon completing the call, when the subscriber hangs up, an on-hook condition is signalled to the PSTN and the connection is terminated in the conventional cellular manner with an on-hook condition being placed on the line.

When a call is being placed to the wireless subscriber, a "page" message is sent by the base station to the cellular transceiver, i.e. this condition is presented to the interface unit. The interface unit coupled with the transceiver activates a ring voltage generator to reflect the ringing state on the PSTN line. When the subscriber goes off-hook to answer the call, the off-hook condition is detected and coupled through to the PSTN line. When the wireless subscriber completes the call, the on-hook condition is detected by the interface unit and the cellular transceiver is instructed to terminate the call and an on-hook condition is also placed back on the PSTN line.

The microprocessor of the interface unit receives signals generated from the on/off-hook detector, which signals are indicative of the on- or off-hook condition of the subscriber's conventional telephone instrument. In response to such signals, the microprocessor begins a call origination or a call reception sequence, as appropriate.

BRIEF DESCRIPTION OF THE DRAWINGS

For a fuller understanding of the nature of the invention, reference should be made to the following detailed description taken in connection with the accompanying drawings, in which.

DETAILED DESCRIPTION OF THE INVENTION

Figure 1:
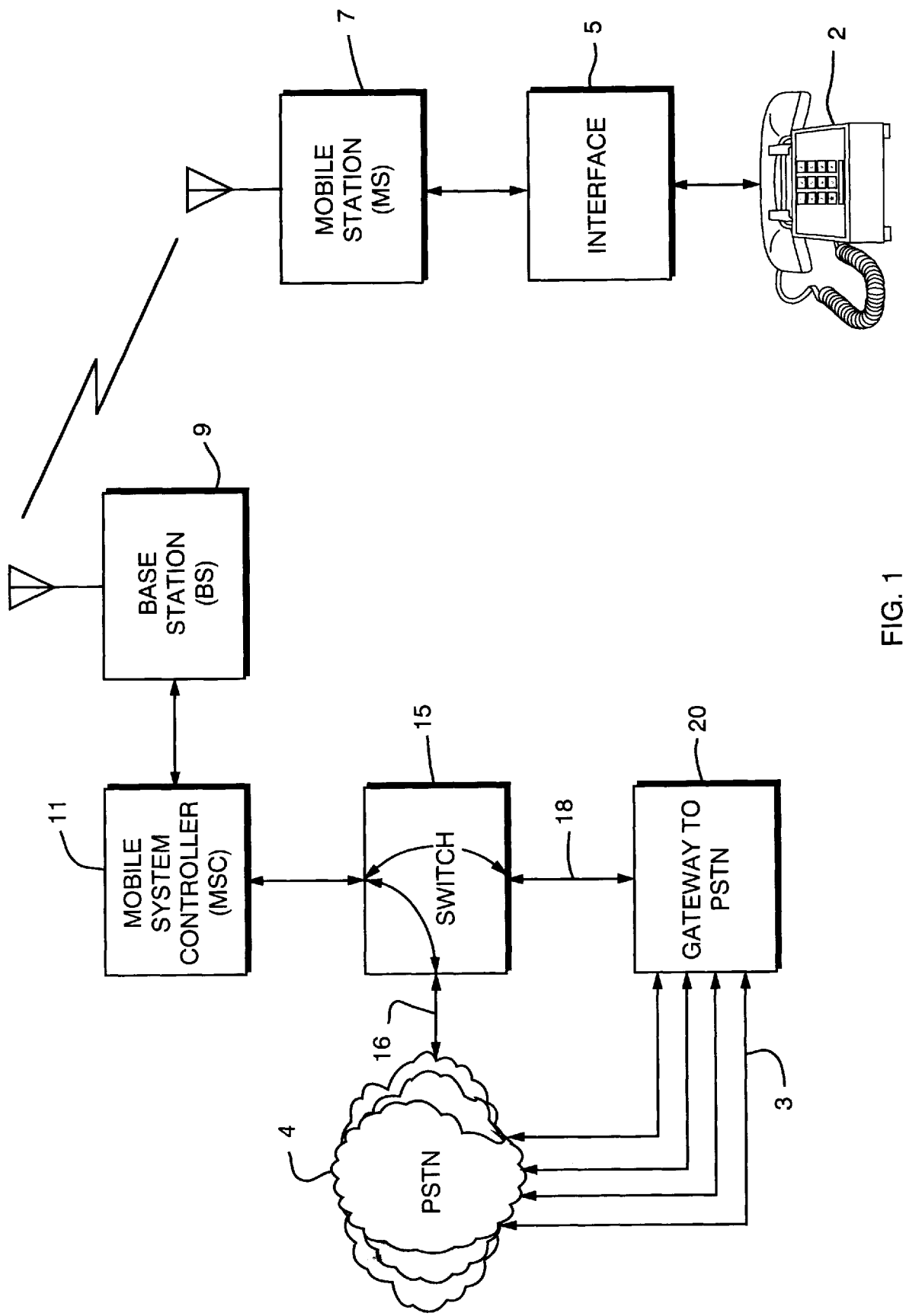
FIG. 1 is a schematic diagram of the system of the present invention depicting the gateway between the wireless telephone system and the wire line public switched telephone network.

As shown in FIG. 1, a virtual connection system embodying the invention connects a subscriber's conventional telephone instrument 2 with that subscriber's dedicated telephone line 3 at the public switched telephone network 4. There is no physical connection between the telephone instrument 2 and the dedicated line 3. Instead, a wireless system provides the desired connection. More specifically, an interface unit 5 is coupled between the telephone instrument 2 and a cellular transceiver 7 at the subscriber's premises. Transceiver 7 communicates with a base station 9 of a wireless cellular telecommunication system.

As with any cellular system, telephone calls are transmitted utilizing a combination of control and voice frequency channels using an established protocol. Base station 9 sets up calls for the transceiver 7, using the forward and reverse control channels and then assigns forward and reverse voice channels for audio signals transmitted from or received by the base station 9 and transceiver 7.

The cellular system, including inter alia, transceiver 7, base station 9, and a mobile system controller (MSC) 111, is used in association with an established PSTN 4. The PSTN 4 by way of its components and structure, has the conventional arrangements for detecting an off-hook subscriber's telephone line, generating a dial tone and processing DTMF signals, and for connecting the subscriber's line to a destination telephone.

The MSC 11 includes a physical or logical switch 15 which makes appropriate connections between the MSC and the central office. In a typical call between a cellular subscriber and a PSTN party, the subscriber initiates the call and the MSC 11 connects to a PSTN line by way of path 16 and dials the telephone number which has been entered by the subscriber.

In accordance with the present invention, the MSC 11 is programmed to recognize a special access code which identifies a subscriber as a gateway subscriber. The access code may be the subscriber's own PSTN telephone number, with an appropriate prefix, if desired. In response to the access code, the MSC 11 connects to a gateway 20, and does not dial the destination number, instead, an off-hook condition is placed on the subscriber's virtual dedicated PSTN line. The gateway 20, to which the MSC 11 connects, is essentially a collection of dedicated subscriber lines 3 to the PSTN 4.

Specifically, in order to access the gateway 20 for an outgoing call, the interface unit 5 is programmed to signal transceiver 7 to transmit the subscriber's predetermined gateway access code over the control channel to base station 9 as if it were placing a call to that number. The gateway access code is transmitted from the base station 9 to the MSC 11. The MSC 11 is programmed to recognize the gateway access codes of subscribers to the system. Each gateway access code signals the MSC 111 to direct its switch 15 to connect a subscriber to a gateway telephone line dedicated to that subscriber, and to place an off-hook condition on that line. In this way, a virtual connection is made between the wireless subscriber's telephone and the subscriber's PSTN line. When such a connection is made, a two-way voice-channel communication circuit is established by virtue of the cellular protocol and the subscriber hears dial tone generated by the PSTN. He or she then dials the destination telephone number in the conventional manner. The DTMF dial signals from the subscriber's telephone instrument are passed over the communication circuit to the subscriber's dedicated line. The PSTN responds by setting up the call just as if the subscriber's telephone instrument were physically connected to that line.

Figure 2:
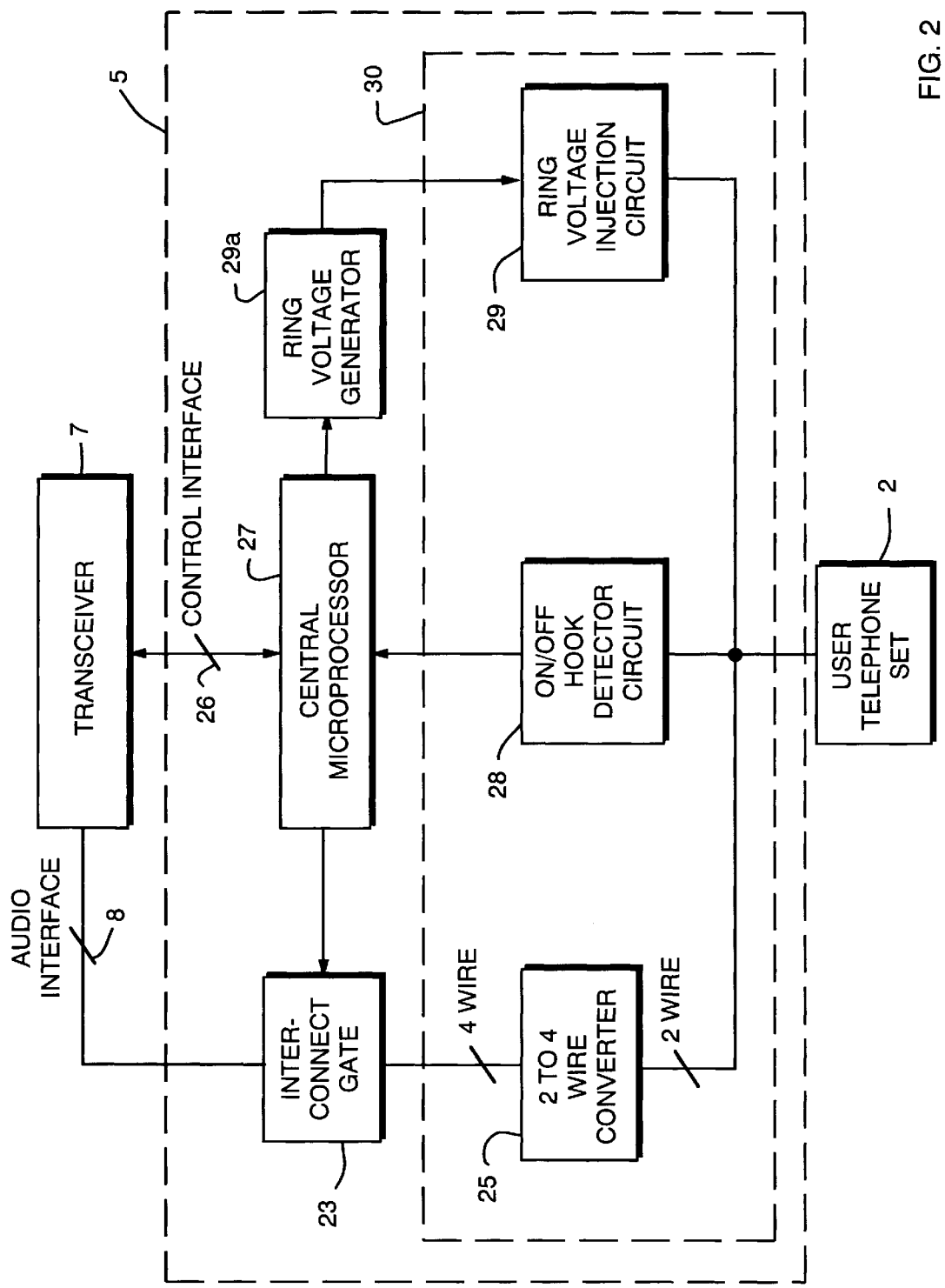
FIG. 2 is a schematic diagram of the interface device embodying the present invention.

The subscriber's interface unit 5 embodying the invention is illustrated in FIG. 2. Audio signals, which include call progression cues, DTMF tones and speech, are transmitted between the transceiver 7 and the user telephone set 2 by way of an audio interface, which is a group of wires designated in FIG. 2 generally by reference character 8. A control interface, represented by a group of wires designated generally by reference character 26, is provided between transceiver 7 and a central microprocessor 27. Microprocessor 27 is programmed to control the handling of telephone calls in accordance with the present invention. The control interface 26 facilitates the transfer of information to and from transceiver 7 for purposes of carrying out of microprocessor 27 commands.

An interconnect gate 23, coupled with audio interface 8, mutes or unmutes the audio paths between the cellular transceiver 7 and the user telephone set 2 at selected points in the sequence of operation described herein. A two-to-four wire converter 25 makes the conversion between the two channel, four-wire arrangement used by the transceiver 7 and the single channel, two-wire arrangement of conventional telephone set 2.

The microprocessor 27 and the interconnect gate 23 are shown as separate elements in FIG. 2, however, if the microprocessor already contained in the transceiver 7 is accessible for programming, then with the appropriate programming, the relevant instructions can be issued to accomplish the functions of microprocessor 27 and the interconnected gate 23.

An on/off-hook detector circuit 28, which is coupled between the subscriber's conventional telephone instrument 2 and the central microprocessor 27, detects on- or off-hook conditions in the telephone set 2. Microprocessor 27 also starts a ring voltage generator 29A which is coupled to the ring voltage injection circuit 29. A ring voltage is provided to ring the user telephone set 2 upon receipt of an incoming call.

The two-to-four wire converter 25, the on/off hook detector 28, and the ring voltage injection circuitry 29 are commercially available in a single device known as a subscriber line interface circuit (SLIC) and are shown as such within dashed box 30 (FIG. 2). Alternatively, a hybrid transformer can be used for the two-to-four wire conversion and a separate circuit could be provided for the ring voltage generator 29. The entire system is powered by a suitable power supply (not shown).

Figure 3:
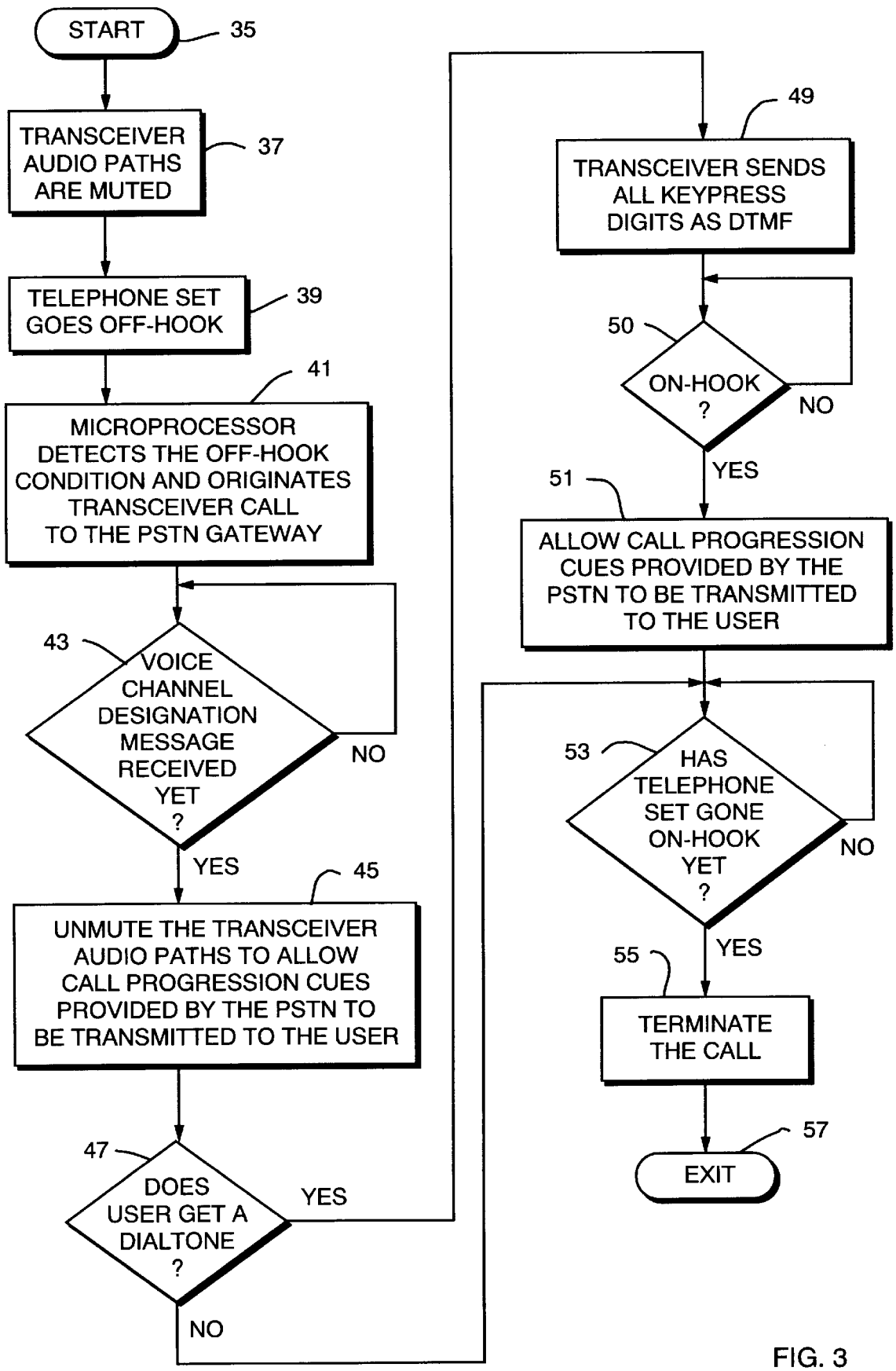
FIG. 3 is a flow chart of a sequence embodying the method of the present invention for originating a call.

The method embodying the present invention for originating a call is schematically illustrated in the flow chart of FIG. 3. A call is initiated as indicated by the "START" step designated by reference character 35. Initially, the transceiver audio paths are muted by the interconnection gate 23 of the audio interface 8 (FIG. 2), as indicated in step 37. The subscriber takes the telephone set off hook to place a call. The off-hook condition is detected by the on/off-hook detector circuit 28 (FIG. 2), as indicated in step 39. This signals microprocessor 27 that the user has gone off-hook. Microprocessor 27 then signals the transceiver to transmit the gateway access code as described herein over a control channel to the base station 9, in step 41. Base station 9 then transmits the gateway access code to MCS 11. The call then connects through to the PSTN gateway 20 (FIG. 1), which results in the subscriber's telephone being connected to a dedicated line which terminates at the PSTN. The off-hook condition of the subscriber's conventional telephone set 2 (FIG. 1) is mirrored by way of the cellular network to the PSTN.

The sequence illustrated in FIG. 3 then includes determining whether a voice channel designation message has been received (43) by transceiver 7. This is part of the normal sequence of signals generated by the mobile system controller 11 and the base station 9 (FIG. 1) when a telephone call is being originated at a transceiver. Thus, a specially designed base station is not required. The system continually checks for the voice designation message as indicated by the feedback loop marked "NO" at step 43. When the message is received, the transceiver audio paths are unmuted (45). In order to accomplish this, microprocessor 27 signals interconnection gate 23 to unmute the audio paths.

The radio link is thereby established and full duplex operation is provided between the subscriber and his/her gateway connection to the PSTN. The PSTN now provides its call progression signals, such as a dial tone, to the subscriber by way of the radio link as if the subscriber's telephone were physically connected to the dedicated PSTN line. The dedicated line having been accessed and the transceiver audio paths having been unmuted, the subscriber hears a PSTN dial tone. The user dials the desired destination telephone number. The sequence includes transceiver 7 then sending digits entered by the subscriber as DTMF signals over the designated reverse voice channel (49) to the PSTN. The PSTN then responds to the DTMF tones by making the appropriate connection to the destination telephone line.

This step utilizes the equipment and signal processing already provided by the PSTN to process DTMF signals. There is no need to digitize the destination number as required in prior techniques. In addition, there is no need to count the digits and to generate a signal to indicate that the last number has been dialed as this is already inherent in the PSTN process.

As the call continues, and for the duration of the call, the sequence includes intermittently checking to determine whether the user telephone instrument 2 has gone to an on-hook condition, steps 50 and 53 (FIG. 3). If the telephone set 2 does go on-hook, the call is terminated by the wireless system in the conventional manner. The microprocessor sequence is exited, steps 55 and 57, respectively.

Returning to step 47, if the subscriber does not obtain a dial tone, then the system is programmed to determine whether the telephone instrument 2 has gone to an on-hook condition and if so, the call is terminated.

Figure 4:
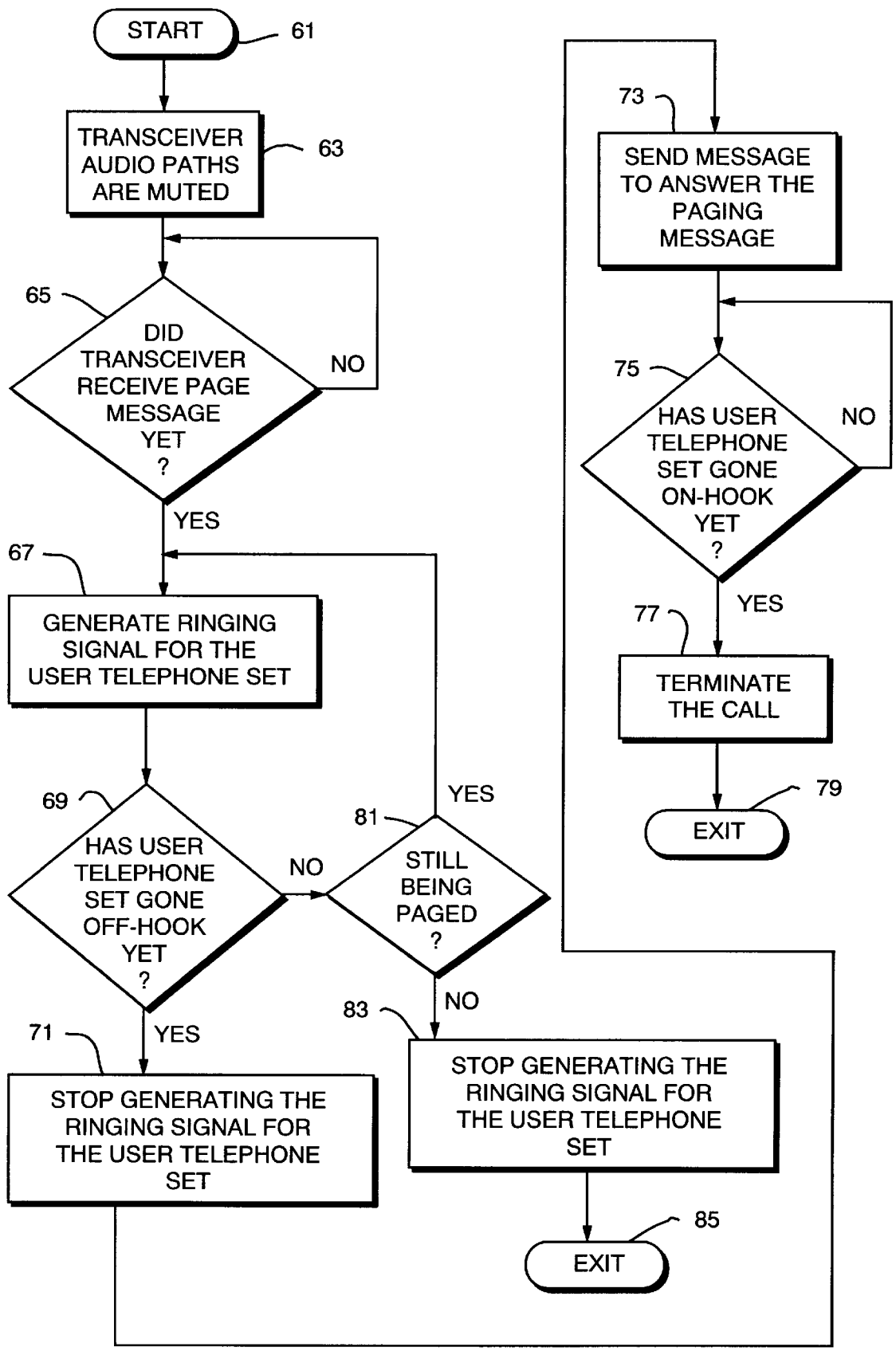
FIG. 4 is a flow chart of a sequence embodying the method of the present invention for receiving a call.

The method embodying the present invention for call reception is schematically shown in the flow chart of FIG. 4. The process begins as shown by the "START" step designated by reference character 61. The transceiver audio paths are muted (step 63). The system then waits for and checks whether the transceiver has received a page message as shown in step 65. When a call is placed from the PSTN to a cellular subscriber, it will get routed to the MSC 11 (FIG. 1). The MSC 11 will then originate a cellular call to the wireless subscriber by issuing a page message to the relevant transceiver 7. As schematically illustrated in FIG. 4 by the feedback loop marked NO at step 65, the system will continually check for such a message.

When a page message is received, a ringing signal for the subscriber's telephone instrument 2 is generated (step 67). More specifically, the ring voltage generator 29 (FIG. 2) injects a ring voltage on to the line. Thereafter, the system checks to determine whether the telephone set 2 has gone to an off-hook condition as shown in step 69 indicating that the telephone has been answered by the subscriber. If an off-hook condition is detected by the on/off-hook detector 28, a signal is sent to microprocessor 27, which, in turn, provides a signal to ring voltage generator 29 to eliminate the ringing signal (step 71). Thereafter, a signal is sent to the transceiver to answer the page message (step 73). The sequence then includes determining whether the telephone instrument 2 has gone to an on-hook condition to terminate the call, and the program includes continually checking the status of the telephone set, as indicated by the feedback loop marked NO, at step 75. If an on-hook condition is detected, the call is terminated and the wireless link is terminated and the PSTN line is returned to an on-hook condition. The microprocessor sequence is exited as shown by steps 77 and 79, respectively, in FIG. 4.

The method embodying the invention includes continuously checking to determine whether it is still being paged as shown in step 81. This would indicate whether the dedicated line at the PSTN remains in a ringing state. If the ringing state is discontinued (by the calling party hanging up), the ringing signal being sent to the telephone set 2 by the ring voltage generator 29 (FIG. 2) is stopped and the sequence is exited as shown in steps 83 and 85. The sequence will also be exited in the case where the telephone set does not go to an off-hook condition after a predetermined number of rings which can be selected as desired in the particular application.

It should be appreciated that the present invention provides a simple and low cost solution to the problem of connecting a telephone subscriber to a public switched telephone network using a wireless transmission system, while utilizing the normal call progression cues provided by the PSTN. The system also utilizes the DTMF signal processing provided by the PSTN and does not require digitization of the telephone number. Further, the system allows for multiple telephone lines to be accessed by one or more conventional base station which does not have to be specially equipped.

The terms and expressions employed herein are used as terms of description and not of limitation, and there is no intention, in the use of such terms and expressions, of excluding any equivalents of the features shown and described or portions thereof, but it is recognized that the various modifications are possible within the scope of the invention claimed.

What is claimed is:

1. A virtual connection system for connecting the conventional telephone instruments of subscribers with dedicated telephone lines for those subscribers at a public switched telephone network ("PSTN"), said conventional telephone instruments each having an on-hook and an off-hook state, the virtual connection system comprising:

(A) a wireless telecommunications system having at least one base station using forward and reverse control channels and forward and reverse voice channels for communications with transceivers of said wireless telecommunications system, and a mobile system controller for switching calls between said wireless telecommunications system and said PSTN;

(B) gateway access switch means for making connections between said wireless telecommunication system and said dedicated telephone lines at said PSTN, responsive to gateway access codes such that when a predetermined gateway access code is received by said switch means, said gateway access switch means connects to a dedicated telephone line at said PSTN identified by that predetermined gateway access code and places said dedicated telephone line in an off-hook state; and (C) a plurality of coupling means, each coupling means for connecting a cellular transceiver of said wireless telecommunications system with at least one conventional telephone instrument of a particular subscriber, each said coupling means having signaling means for passing signals between said telephone instrument and said transceiver of said wireless system, and a microprocessor programmed to signal said transceiver to transmit the predetermined gateway access code for that particular subscriber to said wireless telecommunication system when said subscriber's telephone instrument changes to an off-hook state, whereby said gateway access switch means in response to said predetermined gateway access code connects to a dedicated line at said PSTN in such a manner that said dedicated line also changes to an off-hook state and two-way communication is established between said subscriber's telephone instrument and said dedicated line at the PSTN.

2. The virtual connection system as defined in claim 1, wherein said signaling means has 1) audio interface means for transmitting audio signals between said transceiver and said conventional telephone instrument; and 2) control interface means for transmitting control signals between said transceiver and said microprocessor of said coupling means.

3. The virtual connection system as defined in claim 2, wherein said audio interface means includes a two-to-four wire converter for conversion between two-channel, four-wire transceiver signals and single-channel, two-wire conventional telephone signals; and said control interface means includes (1) a on/off-hook detector connected between said conventional telephone instrument and said microprocessor which senses whether said telephone instrument is in one of said on-hook and said off-hook state and which detector provides a signal to said microprocessor indicative one of said states at a given time; and (2) indicator means for responding to a signal indicative of a call being received at said subscriber's telephone instrument.

4. The virtual connection system as defined in claim 2, wherein said indicator means is a ring voltage generator coupled between said conventional telephone instrument and said microprocessor in such a manner that operation of said ring voltage generator is controlled by signals produced by said microprocessor.

5. The virtual connection system as defined in claim 2, wherein said two-to-four wire converter, said on/off-hook detector, and said ring voltage injection circuitry are included in a subscriber line interface integrated circuit.

6. The virtual connection system as defined in claim 3 wherein said audio interface means also includes an interconnection gate coupled between said transceiver and said two-to-four wire converter, and also being connected to said microprocessor, and being responsive to a signal from said microprocessor to unmute audio signals to said two-to-four wire converter.

7. The virtual connection system as defined in claim 3, wherein said microprocessor includes (1) means for responding to said signal generated by said on/off hook detector when said signal indicates that said telephone instrument goes to an off-hook condition by signaling said transceiver to transmit said predetermined gateway access code; and (2) means for responding to a page signal received by said transceiver when a call is received by said transceiver by generating a signal to said interconnection circuit to activate said indicator means.

8. A method of connecting a conventional telephone instrument of a subscriber to a dedicated telephone line at a public switched telephone network (PSTN), and wherein said PSTN has associated therewith a wireless telecommunications system including a base station and a plurality of mobile station transceivers, and which base station uses forward and reverse control channels and assigns forward and reverse voice channels for communications over the wireless system, and said base station being programmed to generate a voice channel designation message to said transceiver when such frequencies have been assigned, and to generate a page message to said transceiver when a call is received for said subscriber, and said transceiver having audio paths associated therewith, and said transceiver also being coupled with a conventional telephone instrument by a coupling means which has a microprocessor, an on/off-hook detector and a ring voltage generator are coupled between said transceiver and said conventional telephone instrument, the method including the steps of:

(A) providing that said transceiver audio paths are muted;

(B) detecting whether said conventional telephone instrument is in an off-hook condition;

(C) providing a gateway access code to obtain a PSTN dedicated line;

(D) transmitting said PSTN gateway access code when said conventional telephone instrument goes to said off-hook condition to obtain a connection to a PSTN dedicated line;

(E) unmuting said transceiver audio paths when a voice channel designation message is received by said transceiver;

(F) sending all digits entered as a destination number for said telephone call as Dual Tone Multi-Frequency digits over the assigned voice channel to said PSTN such that said PSTN makes a call connection through which associated PSTN call progression cues are obtained; and (G) detecting an on-hook condition for said conventional telephone instrument and when such condition is detected, terminating said wireless call.

9. The method of claim 8 including the steps of (A) intermittently checking to determine whether a page message has been received from the wireless telecommunications system indicating that a telephone call has been received for the subscriber;

(B) providing signaling said ring voltage generator to inject a ring voltage to activate a ringing device in said conventional telephone instrument to signify that a call has been received;

(C) providing a signal to said microprocessor when said telephone instrument changes to an off-hook condition in response to said ringing;

(D) signaling said transceiver to acknowledge said page message; and (E) monitoring said on or off-hook condition of said conventional telephone instrument and signaling said transceiver to terminate the call connection when said telephone instrument changes to an on-hook condition.

10. The method of claim 8 including converting rotary pulse digits to Dual Tone Multi-Frequency digits for transmission of said digits to over a voice channel said PSTN.

* * * * *